T. H. JACOB.
MOTOR VEHICLE REAR AXLE STAND.
APPLICATION FILED JULY 26, 1919.
1,361,262.
Patented Dec. 7, 1920.
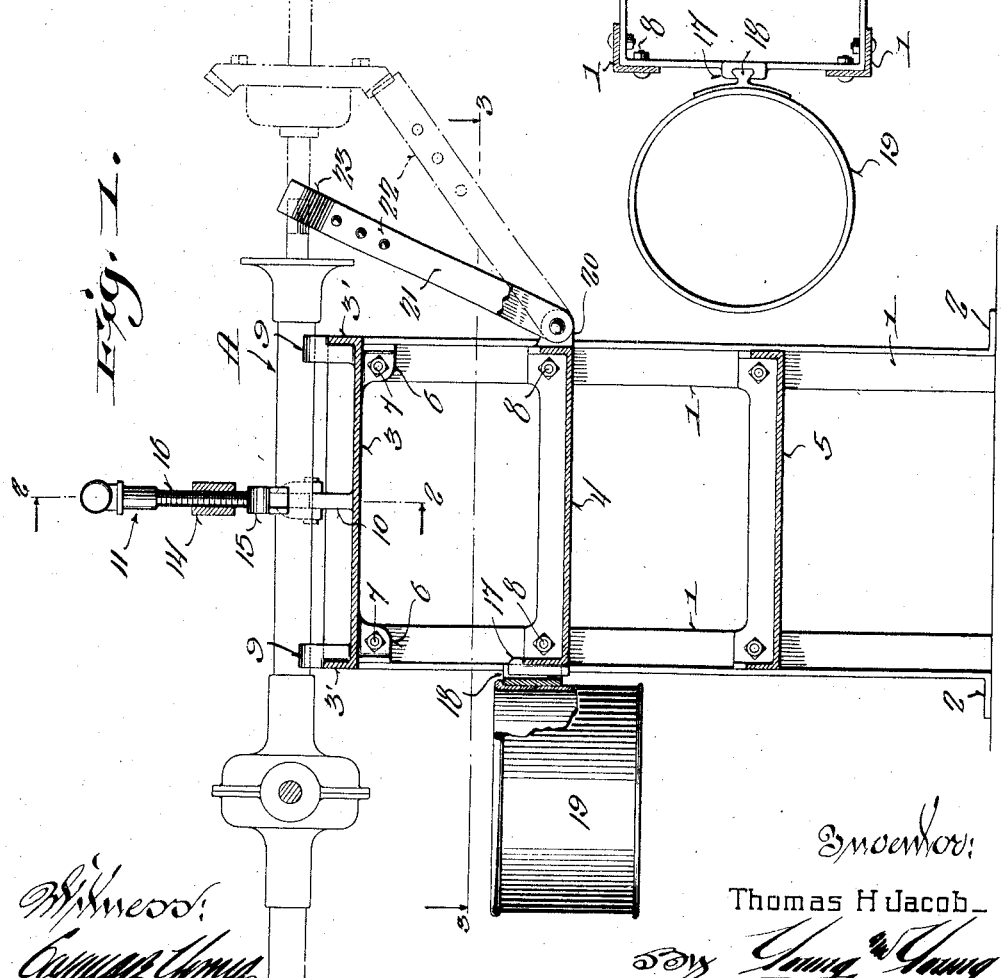

UNITED STATES PATENT OFFICE.

THOMAS H. JACOB, OF WAUSAU, WISCONSIN.

MOTOR-VEHICLE REAR-AXLE STAND.

1,361,262.  Specification of Letters Patent.  Patented Dec. 7, 1920.

Application filed July 26, 1919. Serial No. 313,573.

*To all whom it may concern:*

Be it known that I, THOMAS H. JACOB, a citizen of the United States, and resident of Wausau, in the county of Marathon and State of Wisconsin, have invented certain new and useful Improvements in Motor-Vehicle Rear-Axle Stands; and I do hereby declare that the following is a full, clear, and exact description thereof.

My invention pertains to new and useful improvements in automobile mechanics' stands, the embodiment depicted herein relating particularly to supporting means for rear axles.

It is the object of this invention to provide a stand which will require very little floor space, yet which will be sufficiently large to accommodate a necessary number of tools and the like in addition to the vehicle part being operated upon. This is procured by a compactness in design, a further result of which consists in the fact that several mechanics may work on the axle or the like at the same time.

With this general object in view, the invention resides in the novel features of construction, combination and arrangement of parts which will be hereinafter more particularly described and claimed.

In the accompanying drawing:

Figure 1 represents a vertical sectional view through a stand constructed in accordance with my invention, the several parts thereof being illustrated in use in connection with various parts of a rear axle structure.

Fig. 2 is a second vertical sectional view taken substantially on the plane of the line 2—2 of Fig. 1, and Fig. 3 is a horizontal section taken approximately on the plane of the line 3—3 of Fig. 1.

In its preferred embodiment the invention comprises a stand of convenient height formed of four corner posts 1, each of which is an angle bar having laterally turned attaching feet 2, and a plurality of cast pans or trays 3, 4 and 5. The uppermost pan 3 is seated upon the upper ends of the legs or posts 1, it having depending right angular attaching flanges 6 whereby it is secured to the latter by bolts and nuts 7. The other two pans 4 and 5 have their corners disposed in the angles of the legs 1, they being secured to the latter by bolts 8 which extend through the side flanges thereof.

The opposite side flanges 3' of the pan 3 are each reinforced intermediate their ends and provided with a V-shaped seat 9, said seats being alined to receive and support a rear axle housing A or other vehicle part. These seats are preferably cast integrally with the pan 3 as is also a pair of bosses 10.

The latter project upwardly from the bottom of the pan, one being provided with a pivot ear to permit the pivotal connection of a conventional pipe vise 11 therewith, while the other has a locking lug 12 for coöperation with a latch 13 which is carried by the yoke 14 of said vise. The bosses 10 are so located that the movable jaw 15 of the vise is alined with the seats 9 so that an article resting thereon will be effectively clamped thereagainst by the downward movement of the said jaw 15, such movement being procured in a customary manner through the rotation of the feed screw 16.

One side of the intermediate pan or tray 4 is provided with an attaching element 17 with which a complementary element 18 fixed to a drip pan 19 coöperates. The elements 17 and 18 are of the conventional dove-tail and keyway type to permit the ready removal of the pan 19. From Fig. 3 it will be noted that the pan 19 is positioned midway the length of one side of the tray 4, which will thus position it in alinement with a plane passing through the seats 9. Thus when it is necessary to work upon the differential casing of a rear axle structure, the same is clamped to the top of the stand with said casing over the drip pan to catch the grease and oil when the parts thereof are separated.

The side flange of the tray 4 opposite the flange on which the element 17 is formed, is provided with a pair of spaced ears 20 to which the legs 21 of a retaining member 22 are pivoted. The free end of this member 22 is provided with a diamond-shaped socket 23 adapted to perform any one of several operations, the purpose of all of which is to prevent rotation of the article held by the vise and the seats 9. This retaining member 22 may be inexpensively constructed from a one-piece strap bent upon itself midway its ends, the portion thereof adjacent the bend being provided with said diamond-shaped socket, while the free ends are spread apart to make the legs 21. The portion of the member between said socket and the legs is riveted or otherwise secured together to reinforce the same.

In use, the vehicle part to be repaired or inspected is laid upon the rests or seats 9 while the vise is swung to an open position, after which said vise is closed and locked, and upon the downward movement of the jaw 15 thereof, the article will be tightly clamped to the upper portion of the stand. As hereinbefore mentioned if it is necessary to separate the parts of the differential housing the same is located over the drip pan 19. If, however, it is essential that certain parts of the axle structure be prevented from rotating, the retaining arm 22 is swung so that its socket 23 may either engage over the end of the part to be held as shown in full lines in Fig. 1, or engaged between the teeth of one of the gears as in the dot and dash line position in said figure.

From the foregoing description taken in connection with the accompanying drawing, it will be appreciated that a very simply constructed stand has been invented, and especially that the same may be very inexpensively manufactured, yet which will be extremely efficient in operation. Various minor changes may be made in the form and proportion of the several parts of the device without departing from or sacrificing any of the features of the invention.

I claim:

1. A device of the class described including a table supporting means, a table mounted thereon, article securing means on the table, and an adjustable retaining arm carried by the table supporting means for holding an article against rotation.

2. A device of the class described including a table supporting means, a table mounted thereon, article securing means on the table, and a swinging arm pivoted to the table supporting means for holding the article against rotation.

3. A device of the class described including a plurality of legs, a table mounted on said legs, a tray secured to said legs beneath said table, article securing means on said table, a drip pan detachably connected with one side of said tray and in alinement with said article securing means, and a retaining arm pivoted to the opposite side of said tray for holding the article disposed in said securing means against rotation.

In testimony that I claim the foregoing I have hereunto set my hand at Wausau, in the county of Marathon and State of Wisconsin.

THOMAS H. JACOB.